(12) United States Patent
Katagiri

(10) Patent No.: US 7,930,915 B2
(45) Date of Patent: Apr. 26, 2011

(54) VALET KEY STORAGE DEVICE

(75) Inventor: Toshiharu Katagiri, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 226 days.

(21) Appl. No.: 12/203,066

(22) Filed: Sep. 2, 2008

(65) Prior Publication Data

US 2009/0064741 A1  Mar. 12, 2009

(30) Foreign Application Priority Data

Sep. 12, 2007  (JP) ................................ 2007-236753

(51) Int. Cl.
*B60R 25/02* (2006.01)

(52) U.S. Cl. ............... 70/252; 70/387; 70/388; 70/389; 70/456 R

(58) Field of Classification Search .................. 70/252, 70/389, 429, 456 R, 459, 278.1, 278.2, 414, 70/387, 388, 390, 182–186; 206/37.1, 38.1, 206/37.5; 307/10.3–10.6; 340/5.72, 5.73
See application file for complete search history.

(56) References Cited

U.S. PATENT DOCUMENTS

| | | | | |
|---|---|---|---|---|
| 3,552,160 A | * | 1/1971 | Kleebauer | 70/388 |
| 3,708,032 A | * | 1/1973 | Suzuki | 180/287 |
| 3,851,505 A | * | 12/1974 | Wilkinson | 70/255 |
| 4,318,288 A | * | 3/1982 | Rifat | 70/252 |
| 4,716,748 A | * | 1/1988 | Watanuki et al. | 70/252 |
| 4,898,010 A | * | 2/1990 | Futami et al. | 70/278.1 |
| 5,254,996 A | * | 10/1993 | Claar et al. | 341/176 |
| 5,714,807 A | * | 2/1998 | Albanes | 307/10.2 |
| 6,169,650 B1 | * | 1/2001 | Albrecht | 361/171 |
| 6,546,768 B1 | * | 4/2003 | Burghoff et al. | 70/252 |
| 6,756,698 B2 | * | 6/2004 | Shamoto et al. | 307/10.6 |
| 6,776,016 B1 | * | 8/2004 | Wittwer et al. | 70/252 |
| 7,392,675 B2 | * | 7/2008 | Kito | 70/252 |
| 7,581,422 B2 | * | 9/2009 | Schindler | 70/252 |
| 7,617,708 B2 | * | 11/2009 | Frohne et al. | 70/252 |
| 2008/0100418 A1 | * | 5/2008 | Stobbe et al. | 340/5.73 |
| 2009/0064740 A1 | * | 3/2009 | Katagiri et al. | 70/237 |
| 2009/0091421 A1 | * | 4/2009 | Hirano | 340/5.7 |
| 2010/0071427 A1 | * | 3/2010 | Tsuruta | 70/237 |

FOREIGN PATENT DOCUMENTS

| | | |
|---|---|---|
| CN | 1933997 A | 3/2007 |
| JP | 2006-225976 A | 8/2006 |

OTHER PUBLICATIONS

Office Action dated Sep. 13, 2010 issued by the Chinese Patent Office in corresponding Chinese Patent Application No. 200810149509.7.

* cited by examiner

*Primary Examiner* — Lloyd A Gall

(74) *Attorney, Agent, or Firm* — Roberts Mlotowski; Safran & Cole P.C.

(57) ABSTRACT

A valet key storage device, includes a valet key storage portion for storing a valet key having an opening, a locking bar for locking the valet key, a driving member for driving the locking bar to be inserted into the opening of the valet key, a locking pin for locking the locking bar, a driving section for driving the locking pin to lock the locking bar; and a control section for controlling the driving section to plunge or remove the locking pin into or from the locking bar.

10 Claims, 7 Drawing Sheets

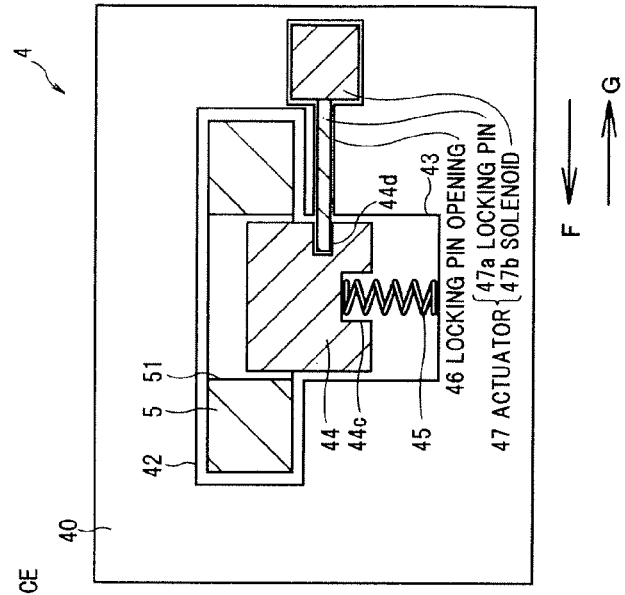
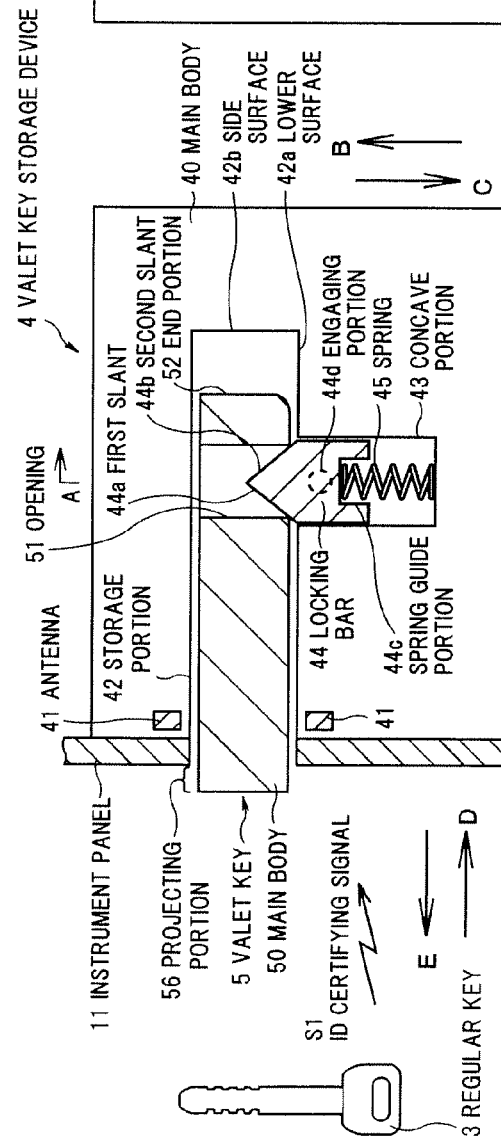

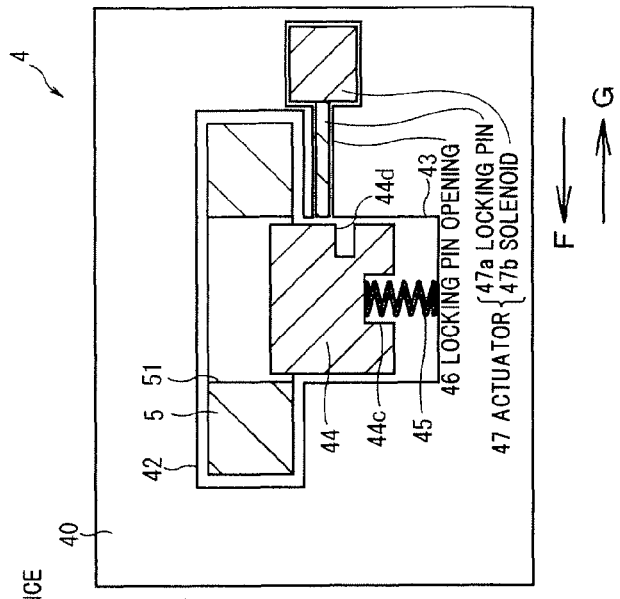
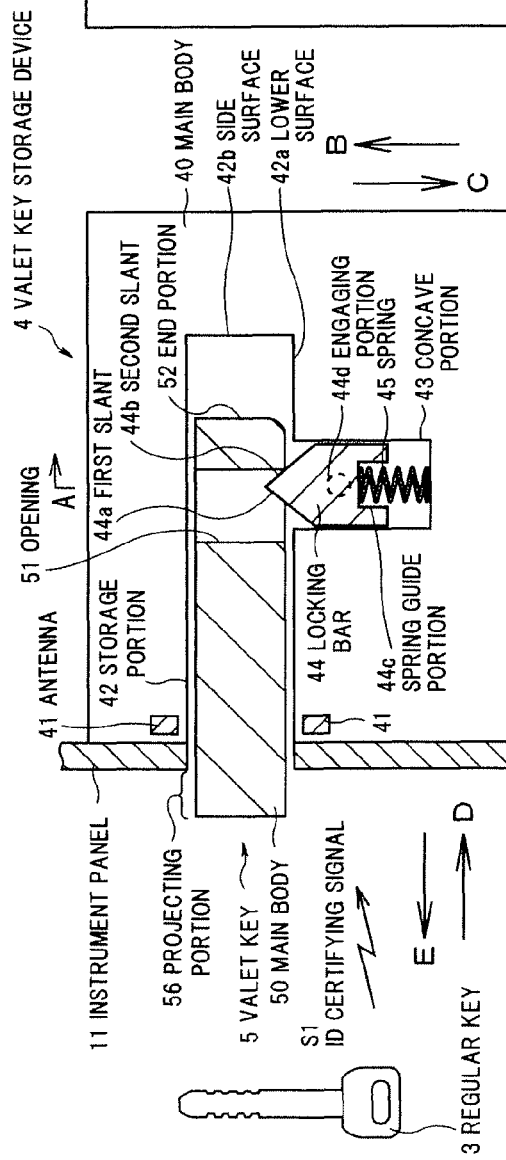

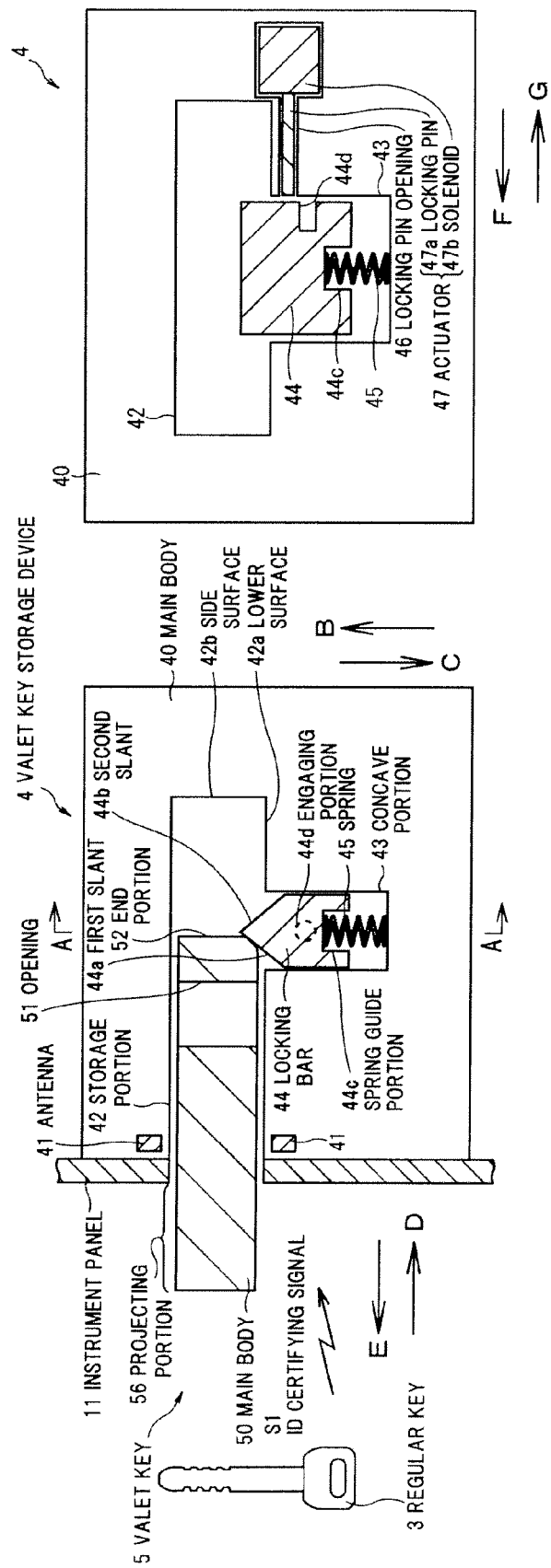

VALET KEY STORAGE DEVICE

The present application is based on Japanese Patent Application No. 2007-236753 filed on Sep. 12, 2007, the entire contents of which are incorporated herein by reference.

BACKGROUND OF THE INVENTION

1. Field of the Invention

The present invention relates to a valet key storage device in which a valet key can be securely stored in a vehicle.

2. Related Art

There are vehicle families which provide two kinds of key, one of which is a master key used by a driver for driving and another is a valet key. The valet key is used, for example, for depositing a vehicle by passing a key to a valet parking attendant of a hotel and entrusting him to move the vehicle to the parking etc. Both of the master key and the valet key can be used for unlocking or locking doors of the vehicle and starting up an engine. Furthermore, it is possible to unlock or lock a trunk or a glove box with the master key, but not with the valet key.

As for key types of a master key and a valet key, there is a key type with a key groove and key teeth which is inserted into a door and a cylinder of an engine start switch, and another key type having an immobilizing function in which the security against a theft or the like is enhanced by communicating with the engine start switch wirelessly.

A key having the immobilizing function is a system with an IC chip called a transponder incorporated in a key or a portable device, letting the transponder to transmit an ID code when bringing the key or the portable device close to an engine switch, permitting the engine to start up when the ID code of the transponder and an ID code on a vehicle side match, and starting up the engine by subsequently pressing a push button of the engine start switch.

A keyless system which activates a function of a valet key provided with the immobilizing function has been proposed, for example, there is a method for setting up a valet mode by an owner activating a mechanical lock of the vehicle with a mechanical key.

Furthermore, there is a smart keyless system disclosed by JP-A 2006-225976 in which it is not necessary to carry two of the master key and the valet key individually and also the security is enhanced, and in this system, a separating piece (tongue) incorporating a transponder in the portable device provided with a mechanical key is provided removably, a tongue isolation signal which indicates the separation of the tongue is transmitted with an ID signal from the portable device when passing the portable device to a valet parking attendant after detaching this tongue, and the valet mode is set up on the vehicle side.

However, according to a conventional smart keyless system, although it is possible to use the portable device separately for the master key and the valet key by attaching and removing the tongue, since the tongue is smaller compared with the portable device, it is possibly lost after separating from the portable device. In case of loss, a vehicle may be stolen by that key. Furthermore, the structure of the portable device becomes complicated. Furthermore, since there is no secure space to store a valet key in a conventional vehicle, it is necessary to carry around an extra key.

THE SUMMARY OF THE INVENTION

Therefore, it is an object of the invention to provide a valet key storage device by which a driver does not need to carry around an extra key and it is possible to store the valet key in the vehicle securely.

According to the present invention, a valet key storage device, comprises:
a valet key storage portion for storing a valet key having an opening;
a locking bar for locking the valet key;
a driving member for driving the locking bar to be inserted into the opening of the valet key;
a locking pin for locking the locking bar;
a driving section for driving the locking pin to lock the locking bar; and
a control section for controlling the driving section to plunge or remove the locking pin into or from the locking bar.

(1) The locking bar has an engaging portion on the side surface,
the locking pin is inserted into the engaging portion of the locking bar.

(2) The locking bar has a first slant at a tip end which contacts with the opening of the valet key when the valet key is inserted into the valet key storage portion, and a second slant at the tip end which contacts with the opening of the valet key when the valet key is removed from the valet key storage portion.

(3) The valet key storage portion is defined in a main body; and
the main body has an antenna which communicates with the valet key stored in the valet key storage portion.

(4) The valet key and the control section has an immobilizing function, and the control section communicates with the valet key stored in the valet key storage portion in a predetermined period based on the immobilizing function.

(5) The control section invalidates a function of the valet key when the valet key is removed from the valet key storage portion in a non-valet mode.

(6) The driving member is a spring.

(7) The driving section is a solenoid.

(8) The valet key storage portion has a stopper supported by an elastic member on a bottom surface of the valet key storage portion, the elastic member being compressed by the stopper when the valet key is stored in the valet key storage portion, and the valet key being locked by the locking bar inserted in the opening of the valet key, while one end of the valet key is projected from the valet key storage portion in accordance with an elastic force of the elastic member when the valet key is unlocked.

(9) The control section shifts a valet key system into a valet mode when a valet switch is turned on to supply a valet switch-on signal to the control section, and an ID possessed by a regular key of a vehicle and an ID of the vehicle are certified by the immobilizing function.

According to the valet key storage device of the present invention, a driver does not need to carry around an extra valet key and it is possible to store the valet key in the vehicle securely.

BRIEF DESCRIPTION OF THE DRAWINGS

Next, the present invention will be explained in more detail in conjunction with appended drawings, wherein:

FIG. 2A is a cross sectional view of the valet key storage device in the first preferred embodiment according to the present invention and FIG. 2B is a cross sectional view of the valet key storage device in the first preferred embodiment according to the present invention along A-A line in FIG. 2A;

FIG. 5A is a cross sectional view of the valet key storage device in the first preferred embodiment according to the present invention at the time of an ejecting operation and FIG. 5B is a cross sectional view along A-A line in FIG. 5A in the first preferred embodiment according to the present invention;

FIG. 6A is a cross sectional view of the valet key storage device in the first preferred embodiment according to the present invention at the time of a store operation and FIG. 6B is a cross sectional view along A-A line in FIG. 6A in the first preferred embodiment according to the present invention;

DESCRIPTION OF THE PREFERRED EMBODIMENTS

First Preferred Embodiment

A valet key storage device in the preferred embodiment according to the present invention will be explained in more detail in conjunction with the appended drawings.

(Structure of Vehicle 1)

Figure 1:
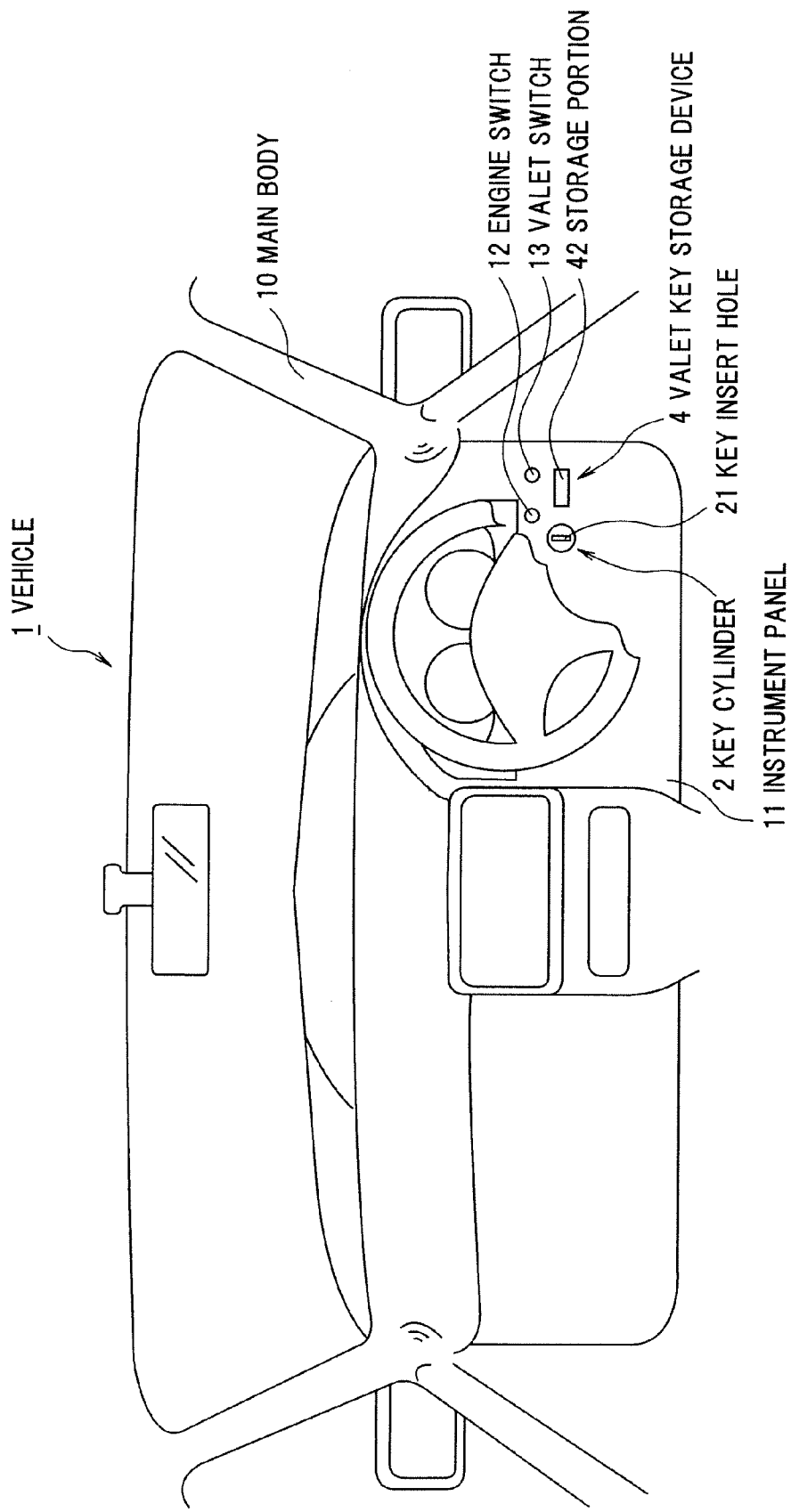
FIG. 1 is a schematic view of the inside of a vehicle in a first preferred embodiment according to the present invention.

FIG. 1 is a schematic view of the inside of a vehicle in a first preferred embodiment according to the present invention. As shown in FIG. 1, a vehicle 1 has a main body 10 mounting a below-described engine and a ECU (Electronic Control Unit) as a control section and an instrument panel 11 to which various switches or the like are installed, where the instrument panel 11 is provided with a key cylinder 2, a valet key storage device 4 for storing a below-described valet key, an engine switch 12 and a valet switch 13. Since the ECU mounted on the vehicle 1 is provided with an immobilizing function, the vehicle 1 is configured not to allow an engine to be started up by only a mechanical key neither by an unauthorized operation of the key cylinder 2, such as picking or the like against the key cylinder 2.

In the engine switch 12, for example, the ECU certifies an ID (identification) stored in the ECU and an ID stored in a regular key which is wirelessly transmitted from a below-described regular key and received via an antenna of the vehicle 1, and when two IDs match, namely, after matching two IDs by an authentication operation by the immobilizing function, the engine can be started by pressing the engine switch 12.

For example, the valet switch 13 is a switch for turning on a valet mode which is used for depositing the vehicle 1 to a valet attendant of a hotel, and the valet mode is a mode which is set up by the ECU for controlling the vehicle 1 so that, for example, only startup/stop of the engine of the vehicle 1 and locking/unlocking of a door lock of the vehicle 1 are conducted by the below-described valet key. ECU has a valet system, the valet system has the valet mode and a normal mode. The ID of the regular key and that of the vehicle 1 need to match for shifting to the valet mode, and when the ID is not certified, it is not possible to use the valet key even if the driver presses the valet switch 13. As for the mode of the vehicle 1 in the first and second preferred embodiments, there is the normal mode besides the valet mode, and the normal mode is a mode in which it is possible to conduct all operations using a regular key, for example, locking and unlocking of a trunk, groove box or the like in the vehicle 1.

(Structure of the Valet Key Storage Device 4)

Figure 3:
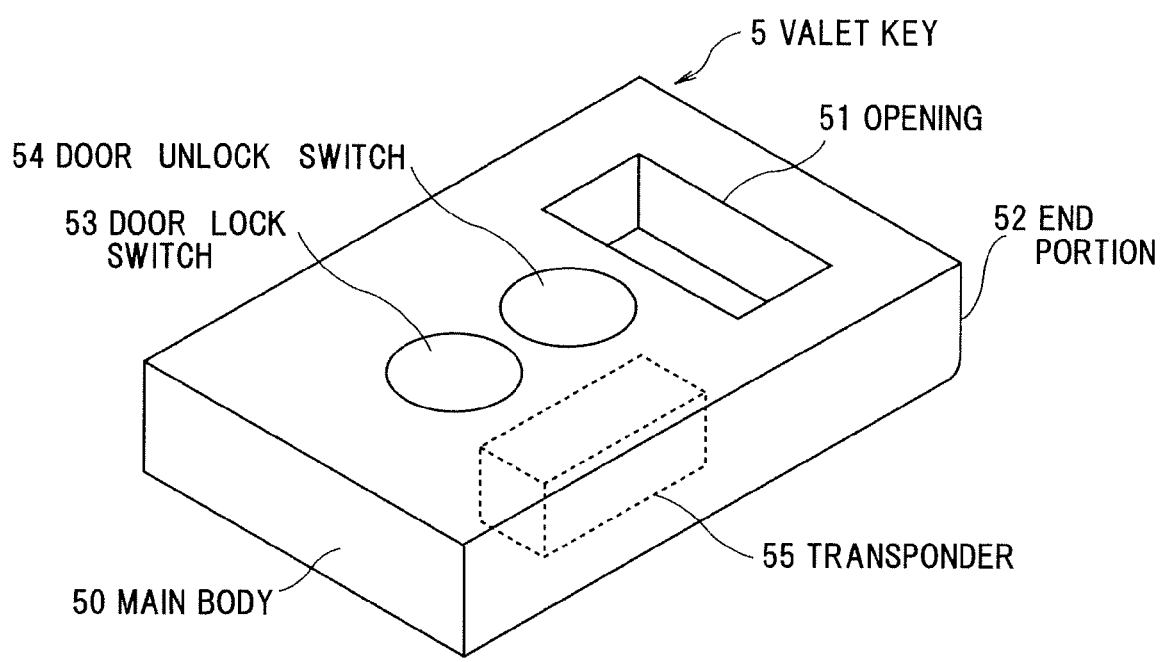
FIG. 3 is a perspective view of the valet key storage device in the first preferred embodiment according to the present invention.
Figure 4:
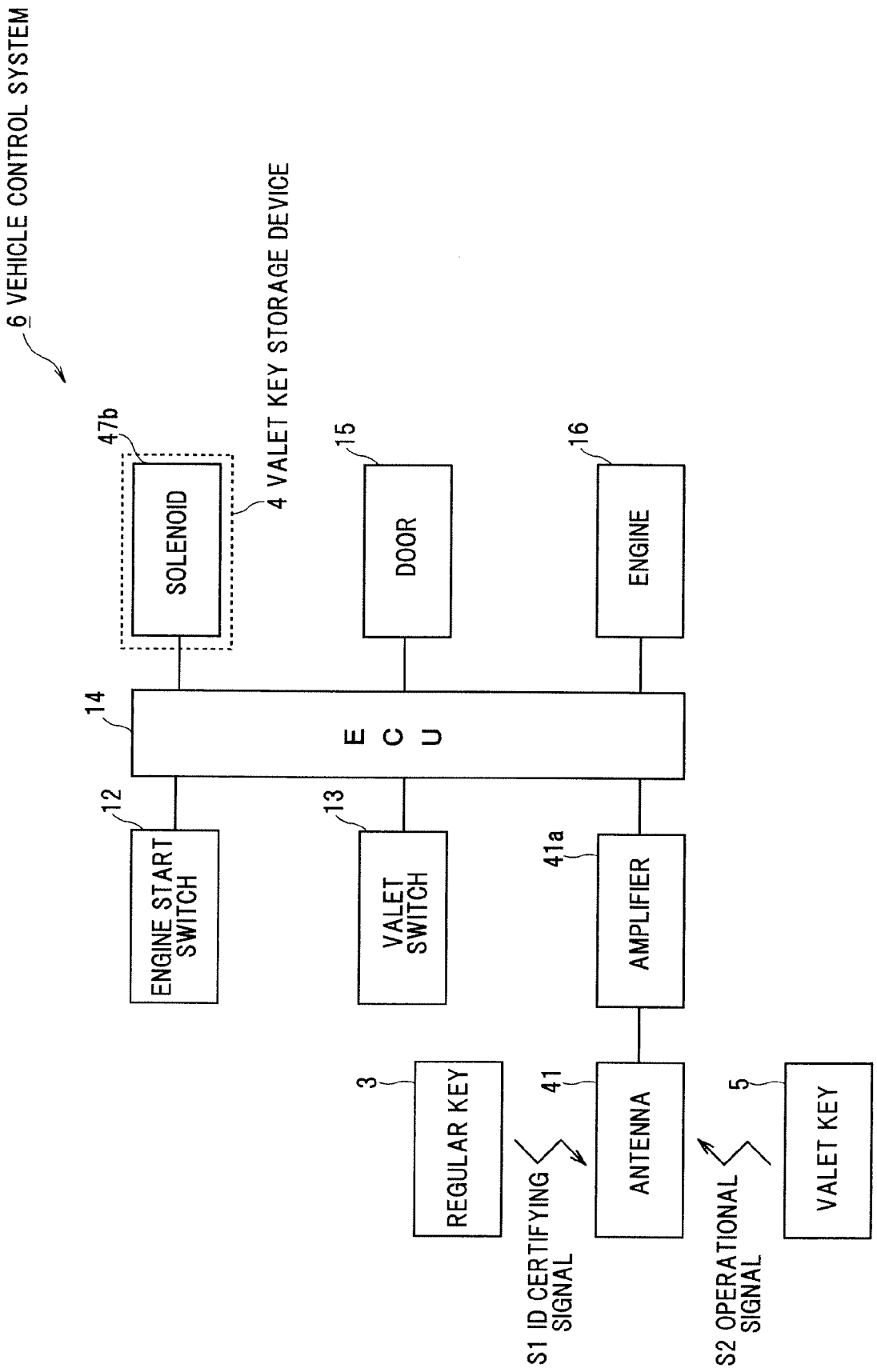
FIG. 4 is a block diagram of a vehicle control system in respect to the valet key storage device in the first preferred embodiment according to the present invention.

FIG. 2A is a cross sectional view of the valet key storage device in the first preferred embodiment according to the present invention and FIG. 2B is a cross sectional view of the valet key storage device in the first preferred embodiment according to the present invention along A-A line in FIG. 2A, FIG. 3 is a perspective view of the valet key storage device in the first preferred embodiment according to the present invention and FIG. 4 is a block diagram of a vehicle control system in respect to the valet key storage device in the first preferred embodiment according to the present invention. A slashed portion of the valet key storage device 4 to a main body 40 is omitted below to facilitate visualization.

As shown in FIG. 2A, FIG. 2B and FIG. 4, the valet key storage device 4 is schematically configured to comprise an ECU 14, a storage portion 42 as a valet key storage portion, a spring 45 as a driving member, a locking bar 44, a locking pin opening 46, a locking pin 47a and a solenoid 47b as a driving section.

Furthermore, as shown in FIG. 2A, the valet key storage device 4 is schematically configured to comprise the main body 40 formed of a resin material or a metallic material in which the storage portion 42 and a concave portion 43 are formed, an antenna 41 provided near the storage portion 42 of the main body 40 for communicating with a regular key 3 and a valet key 5, and the concave portion 43 for storing the locking bar 44 and the spring 45.

As shown in FIGS. 2A and 2B, for example, the storage portion 42 is in a rectangular shape and has a lower surface 42a which is a surface parallel to a direction to insert the valet key 5, namely, a direction indicated by an arrow D shown in FIG. 2A and a side surface 42b which is a surface vertical to the arrow D direction, furthermore, the concave portion 43 is provided on the lower surface 42a.

(Structure of the Locking Bar 44)

As shown in FIGS. 2A and 2B, the locking bar 44 is, for example, formed of a resin material or a metallic material and is schematically configured to comprise a first slant 44a, a second slant 44b, a spring guide portion 44c provided with the spring 45 and an engaging portion 44d to which the locking pin 47b enters.

The first slant 44a is provided for storing the valet key 5 in the storage portion 42 smoothly by contacting with an end portion 52 of the valet key 5 and converting a force in the arrow D direction into a force in an arrow C direction when storing the valet key 5 in the storage portion 42.

The second slant 44b is provided for taking out the valet key 5 from the storage portion 42 smoothly by contacting with an inner wall of the opening 51 of the valet key 5 and converting the force in an arrow E direction to take out the valet key 5 into the force in the arrow C direction when taking out the valet key 5 from the storage portion 42. In any cases, it is a state that the locking pin 47a shown in FIG. 2B does not enter the engaging portion 44d, namely, the locking bar 44 is not locked by the locking pin 47a.

(Structure of the Spring 45)

As an example, the spring 45 is a coil spring in a coiled shape, is provided between the concave portion 43 provided on the lower surface 42a of the storage portion 42 and the spring guide portion 44c of the locking bar 44 and is configured to apply the elastic force in the arrow B direction shown in FIG. 2A against the locking bar 44. The spring 45 is not limited thereto, it is acceptable as long as it is a member having an elastic force, such as a plate spring, a rubber or the like.

(Structure of the Actuator 47)

As shown in FIGS. 2A and 2B, the actuator 47 is schematically configured to comprise the locking pin 47a, and the solenoid 47b for driving the locking pin 47a using a non-illustrated magnetic body and a magnet coil. The locking pin 47a is configured to be stored inside the solenoid 47b when driving the solenoid 47b in an arrow G direction. In this preferred embodiment, although the locking pin 47a is configured by extending an axis activated by the solenoid 47b, it may be a configuration that the axis and the locking pin 47a are different.

(Structure of the Valet Key 5)

As shown in FIG. 3, the valet key 5 is schematically configured to comprise a main body 50 mounting electronic components such as a non-illustrated battery, a transponder 55 or the like, an opening 51 formed on the main body 50 and allowing a key holder, accessories or the like to be connected, the end portion 52, a door lock switch 53 which is a button to lock a door of the vehicle 1 wirelessly, a door unlock switch 54 which is a button to unlock the door of the vehicle 1 wirelessly and the transponder 55 which communicates with a below-described ECU 14 via the antenna 41. Although the valet key 5 in this preferred embodiment is a portable device not having a mechanical key, it may be a key type having a mechanical key, and it is not limited thereto.

It is not necessary to process the opening 51 of the valet key 5 specifically, an opening provided in a conventional key may be diverted for use, in addition, it may be a concave portion not penetrating through the main body 50 to which the locking bar 44 is freely insertable, furthermore, it may be a configuration that the locking bar 44 enters the opening or the concave portion provided on the side surface of the valet key 5 and is coupled therewith, and it is not limited thereto.

The transponder 55 is schematically configured to comprise a non-illustrated CPU (Central Processing Unit), a power supply circuit, a detector circuit, a memory unit to store an ID or the like. Furthermore, the transponder 55 communicates with the ECU 14 via the antenna 41 of the valet key storage device 4 in a predetermined period, and based on this communication, the ECU 14 verifies whether or not the valet key 5 is stored in the valet key storage device 4. For example, when the communication between the ECU 14 and the valet key 5 becomes impossible even though the mode is not shifted to the valet mode, namely, when the valet key 5 is taken out from the valet key storage device 4 illegally, the ECU 14 controls the vehicle 1 so as not to accept any operations by the valet key 5, namely, so as to invalidate the function of the valet key 5. In other words, the ECU 14 invalidates the function of the valet key 5 when the valet key 5 removed from the storage portion 42 in a non-valet mode.

(Structure of Vehicle Control System 6)

As shown in FIG. 4, a vehicle control system 6 is schematically configured to comprise the regular key 3 having a button, a transponder and a mechanical key or the like which enable the locking or the unlocking of the door and allowing all operations using a key to the vehicle 1 to be conducted, the solenoid 47b of the valet key storage device 4, the valet key 5, the engine switch 12, the valet switch 13, the ECU 14, a door 15, an engine 16, the antenna 41 and an amplifier 41a to amplify an electric wave received by the antenna 41.

The ECU 14 has an immobilizing function and is schematically configured to comprise a non-illustrated CPU, a power supply circuit, an ID authentication circuit, a memory unit to store an ID, or the like. When an ID certifying signal S1 of the regular key 3 received via the antenna 41 and the amplifier 41a matches the ID of the vehicle 1, the ECU 14 sets up the mode of the vehicle 1 to be a normal mode and permits the startup of the engine 16 or the like. Following this, when the valet switch 13 is pressed, the ECU 14 sets up the mode of the vehicle 1 to be a valet mode and controls the startup/stop of the engine 16 and locking/unlocking of the door 15 of the vehicle 1 based on a signal transmitted from the engine switch 12 and an operational signal S2 from the valet key 5. The operational signal S2 includes the ID of the valet key 5

Furthermore, the ECU 14 controls the solenoid 47b of the actuator 47 and transmits signals to the solenoid 47b, a restriction signal when restricting the displacement of the locking bar 44 and a restriction release signal when releasing the restriction of the displacement of the locking bar 44.

Operation of the First Preferred Embodiment

Operation of the valet key storage device 4 in the first preferred embodiment will be explained in more detail in conjunction with each drawing.

FIG. 5A is a cross sectional view of the valet key storage device in the first preferred embodiment according to the present invention at the time of an ejecting operation and FIG. 5B is a cross sectional view along A-A line in FIG. 5A in the first preferred embodiment according to the present invention, FIG. 6A is a cross sectional view of the valet key storage device in the first preferred embodiment according to the present invention at the time of a store operation and FIG. 6B is a cross sectional view along A-A line in FIG. 6A in the first preferred embodiment according to the present invention.

(Ejecting Operation of the Valet Key 5)

When a driver gets into the vehicle 1 with the regular key 3, the antenna 41 receives the ID certifying signal S1 transmitted from the regular key 3 and the ECU 14 which receives the ID certifying signal S1 via the antenna 41 and the amplifier 41a certifies the ID of the regular key 3 and the ID of the vehicle 1.

When the ID of the regular key 3 matches the ID of the vehicle 1, the ECU 14 shifts a mode to the normal mode in which it is possible to start up or stop the engine 16 of the vehicle 1. When the driver presses the engine switch 12 shown in FIG. 1, the ECU 14 starts the engine 16 controlling a non-illustrated ignition system. ECU 14 may drive the locking pin 47a via the solenoid 47b, and release the lock of the valet key 5, when the vehicle 1 is in the normal mode.

After driving the vehicle 1 in the normal mode, the driver arrives at a hotel which is a destination and presses the valet switch 13 shown in FIG. 1 after stopping the engine 16 for depositing the vehicle 1 to a valet attendance of the hotel.

Since the ID of the regular key 3 matches the ID of the vehicle 1, the ECU 14, which received a signal from the valet switch 13 for shifting to the valet mode, shifts the mode of the vehicle 1 to the valet mode, furthermore, transmits the restriction release signal to the solenoid 47b of the valet key storage device 4, and displaces the locking pin 47a in the arrow G direction shown in FIG. 5B until the locking pin 47a comes out from the engaging portion 44d of the locking bar 44. In the first preferred embodiment and the below-described second preferred embodiment, when the valet key 5 is taken out from the valet key storage device 4, the locking pin 47a is in a state shown in FIG. 5B. The locking pin 47a enters the engaging portion 44d of the locking bar 44 only when not allowing the valet key 5 to be taken out by being stored in the valet key storage device 4 and restricting the displacement of the locking bar 44.

The driver pulls out the valet key 5 in an arrow E direction shown in FIG. 5A holding a projecting portion 56 of the valet key 5 shown in FIG. 2 by hand. At this time, since the opening 51 of the valet key 5 contacts with the second slant 44b, the force in the arrow E direction shown in FIG. 5A is converted into the force in the arrow C direction and the locking bar 44 is displaced in the arrow C direction shrinking the spring 45, the driver can take out the valet key 5 from the valet key storage device 4. And then, the driver passes the ejected valet key 5 to the valet attendant.

After receiving the valet key 5 from the driver, the valet attendant gets into the vehicle 1 and presses the engine switch 12. Since the mode has been already shifted to the valet mode, the ECU 14 starts the engine 16 controlling the non-illustrated ignition system. The valet attendant drives the vehicle 1 and stops it at a predetermined space, then, the valet attendant stops the engine 16 by pushing down the engine switch 12 and pushes down the door lock switch 53 of the valet key 5 after getting off the vehicle. The valet key 5 transmits the operational signal S2 to the vehicle 1 and the ECU 14 locks the door 15 of the vehicle 1. Since the valet key 5 communicates with the ECU 14 via the antenna 41 and the amplifier 41a in the predetermined period, it is not possible to start the engine 16 unless the valet key 5 is located at a position where the communication with the ECU 14 is possible.

(Store Operation of the Valet Key 5)

The driver receives the valet key 5 from the valet attendant for driving the vehicle 1, gets into the vehicle 1 unlocking the door 15 by the regular key 3 or the valet key 5 and inserts the valet key 5 into the storage portion 42 of the valet key storage device 4 in the arrow D direction shown in FIG. 6A from the end portion 52.

At this time, as shown in FIG. 6A, the end portion 52 of the valet key 5 contacts with the first slant 44a of the locking bar 44, the force in the arrow D direction shown in FIG. 6A is converted into the force in the arrow C direction and the locking bar 44 is displaced in the arrow C direction shrinking the spring 45. Furthermore, when further pushing the valet key 5 in the arrow D direction, since the elastic force is applied to the locking bar 44 in the arrow B direction, the tip end of the locking bar 44 enters the opening 51, and the first slant 44a and the second slant 44b contacts with the opening 51 by further pushing the valet key 5 as shown in FIG. 2A.

Following this, when the valet mode is released by an operation of the driver, the ECU 14 transmits the restriction signal to the solenoid 47b, displaces the locking pin 47a in an arrow F direction shown in FIG. 6B so as to let the locking pin 47a entered the engaging portion 44d of the locking bar 44. Since the main body 40 and the locking bar 44 are fixed in the state that the locking pin 47a has entered the engaging portion 44d of the locking bar 44, even if trying to take out the valet key 5, it is not possible to take out the valet key 5 as the locking bar 44 restricts the displacement in the arrow C direction shown in FIG. 6A.

Effect of the First Preferred Embodiment (1) According to the above-mentioned first preferred embodiment, since it is possible to store the valet key 5 in the vehicle 1 securely, the driver does not need to carry around an extra valet key 5.

(2) According to the above-mentioned first preferred embodiment, since the valet key 5 has the immobilizing function, it is possible to communicate with the vehicle 1 in the state that the valet key 5 is stored in the valet key storage device 4.

(3) According to the above-mentioned first preferred embodiment, it is possible to verify whether or not the valet key 5 is stored in the valet key storage device 4 by communicating with the valet key 5 in the predetermined period using the immobilizing function.

(4) According to the above-mentioned first preferred embodiment, since the valet key storage device 4 has the antenna 41 adjacent to the storage portion 42, it is possible to certainly communicate with the stored valet key 5.

(5) According to the above-mentioned first preferred embodiment, since the immobilizing function is used for the communication with the valet key 5, it is possible to invalidate the function of the valet key 5 based on the unauthorized withdrawal of the valet key 5 from the valet key storage device 4.

(6) According to the above-mentioned first preferred embodiment, since the spring 45 is used as a first elastic member, it is possible to reduce the cost.

(7) According to the above-mentioned first preferred embodiment, it is easy to control since the solenoid 47b is used as the driving section.

(8) According to the above-mentioned first preferred embodiment, since the locking bar 44 has the first slant 44a and the second slant 44b, it is possible to insert and eject the valet key 5 smoothly.

Second Preferred Embodiment

A valet key storage device in the second preferred embodiment according to the present invention will be explained in more detail in conjunction with the drawing. The explanation for the portions which have the same structures and functions as the first preferred embodiment will be omitted by referring the mutual numbers in the following explanation. Furthermore, the structure of the valet key storage device 4 shown in FIG. 2B will be referred since it is same in this embodiment.

(Structure of the Valet Key Storage Device 4)

Figure 7A:
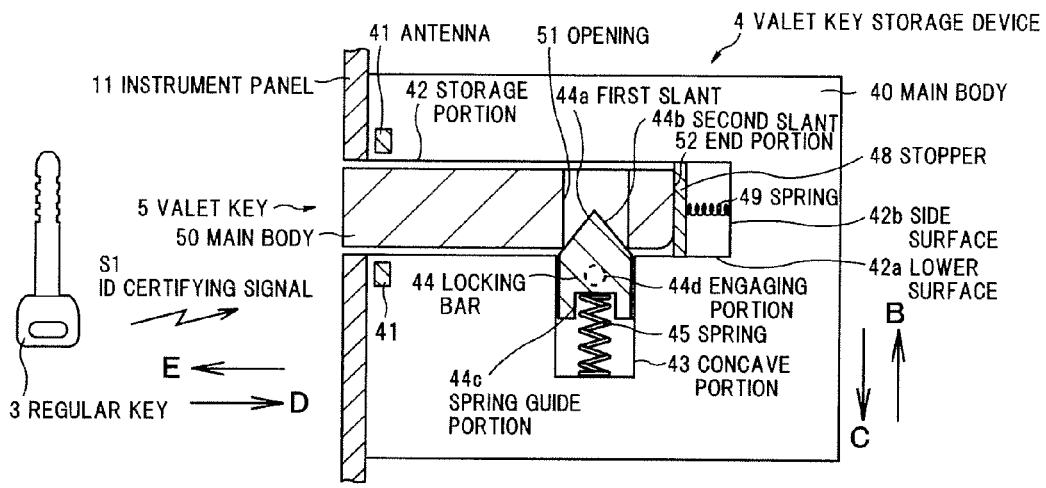
FIG. 7A is a cross sectional view of the valet key storage device in a second preferred embodiment according to the present invention.
Figure 7B:
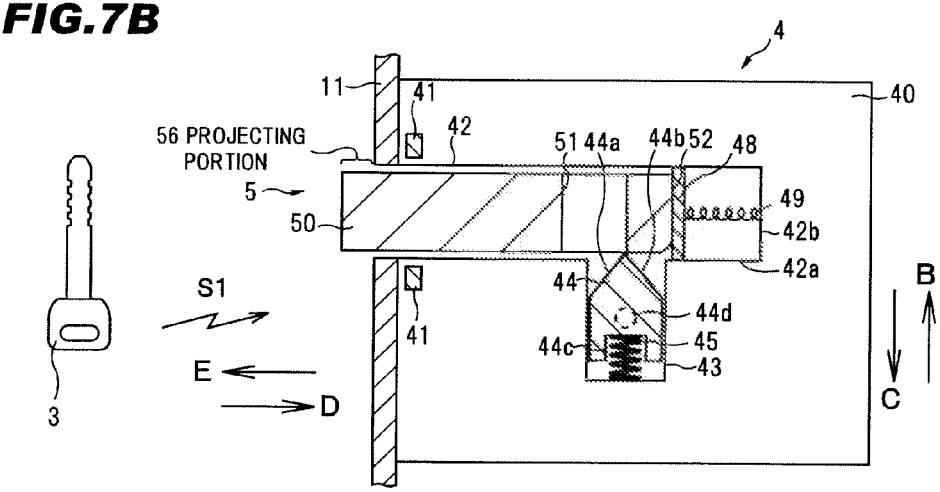
FIG. 7B is a cross sectional view of the valet key storage device in the second preferred embodiment according to the present invention at the time of an ejecting operation and FIG. 7C is a cross sectional view of the valet key storage device in the second preferred embodiment according to the present invention after taking out the valet key.
Figure 7C:
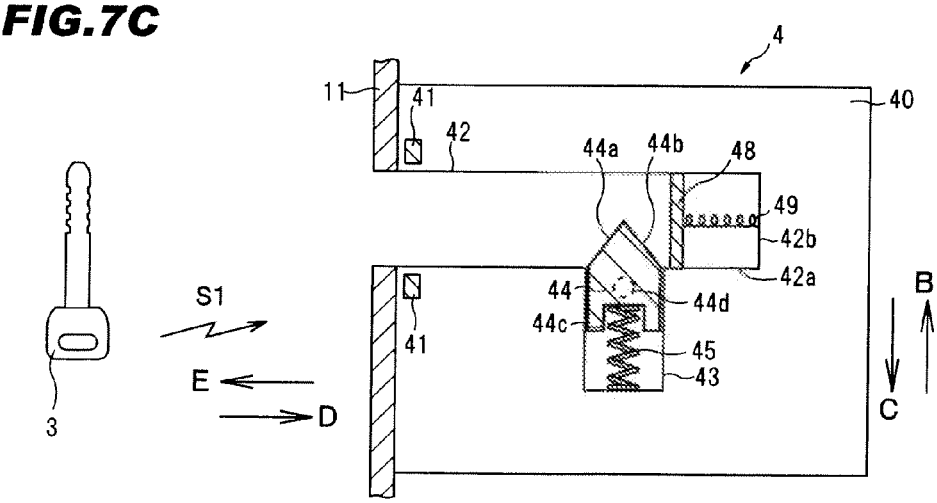

FIG. 7A is a cross sectional view of the valet key storage device in a second preferred embodiment according to the present invention, FIG. 7B is a cross sectional view of the valet key storage device in the second preferred embodiment according to the present invention at the time of an ejecting operation and FIG. 7C is a cross sectional view of the valet key storage device in the second preferred embodiment according to the present invention after taking out the valet key. In this preferred embodiment, to enhance security, the end of the valet key 5 is configured not to come out from the instrument panel 11 when being stored in the valet key storage device 4.

In the valet key storage device 4 in this preferred embodiment, a stopper 48 and a spring (elastic member) 49 are newly provided compared with that of the first preferred embodiment.

The stopper 48 is a plate-like member having a rectangular shape conformed to the shape of the storage portion 42, in which the spring 49 shown in FIG. 7A is provided between a surface faced to the surface contacting with the end portion 52 of the valet key 5 and the side surface (bottom surface) 42b. The spring 49 applies an elastic force to the stopper 48 in the arrow E direction.

(Ejecting Operation of the Valet Key 5)

When the driver presses the valet switch 13 shown in FIG. 1 for passing the valet key 5 to the valet attendant, since the ID of the regular key 3 matches the ID of the vehicle 1, the ECU 14, which received a signal from the valet switch 13 for shifting to the valet mode, shifts the mode of the vehicle 1 to the valet mode, furthermore, transmits the restriction release signal to the solenoid 47b of the valet key storage device 4, and displaces the locking pin 47a in the arrow G direction shown in FIG. 2B until the locking pin 47a comes out from the engaging portion 44d of the locking bar 44.

Since the elastic force is applied to the valet key 5 by the spring 49 in the arrow E direction when the locking pin 47a comes out from the engaging portion 44d of the locking bar 44, the valet key 5 is displaced in the arrow E direction pushing the second slant 44b contacting with the opening 51 of the valet key 5 in the arrow C direction and is pushed out from the storage portion 42 as shown in FIG. 7B.

The driver pulls out the valet key 5 holding the projecting portion 56 of the valet key 5 by hand, and then, passes it to the valet attendant. At this time, since the locking bar 44 receives the elastic force by the spring 45 in the arrow B direction shown in FIG. 7B, the locking bar 44 comes to rest in the state shown in FIG. 7C being displaced in the arrow B direction.
(Store Operation of the Valet Key 5)

The driver receives the valet key 5 from the valet attendant for driving the vehicle 1, gets into the vehicle 1 unlocking the door 15 by the regular key 3 or the valet key 5 and inserts the valet key 5 into the storage portion 42 of the valet key storage device 4 in the arrow D direction shown in FIG. 7C from the end portion 52.

At this time, similar to the store operation of the first preferred embodiment, the end portion 52 of the valet key 5 contacts with the first slant 44a of the locking bar 44, the locking bar 44 is displaced in the arrow C direction and burrows into the lower surface of the valet key 5 shrinking the spring 45. Furthermore, when further pushing the valet key 5 in the arrow D direction, the end portion 52 of the valet key 5 contacts with the stopper 48 by which the spring 49 shrinks in the arrow D direction via the stopper 48 as shown in FIG. 7B.

Following this, since the elastic force is applied to the locking bar 44 in the arrow B direction by the spring 45, the tip end of the locking bar 44 enters the opening 51. The locking bar 44 enters the opening 51 of the valet key 5 by further pushing the valet key 5 by the driver as shown in FIG. 7A.

When the valet mode is released by the operation of the driver, the ECU 14 transmits the restriction signal to the solenoid 47b, displaces the locking pin 47a in the arrow F direction shown in FIG. 2B, and restricts the displacement of the locking bar 44 letting the locking pin 47a entered the engaging portion 44d of the locking bar 44.

At this time, since the valet key 5 is completely stored in the valet key storage device 4, it becomes difficult to take out the valet key 5 in the stored state, thus, it is possible to store the valet key 5 in the vehicle 1 more securely.
(Effect)

(1) According to the above-mentioned second preferred embodiment, since the valet key 5 is completely stored in the storage portion 42, it is difficult to take out the valet key 5 from the valet key storage device 4 when not being in the valet mode, thus, it is possible to store the valet key 5 in the vehicle 1 more securely.

(2) According to the above-mentioned second preferred embodiment, since the valet key 5 is completely stored in the storage portion 42, the design is excellent.

(3) According to the above-mentioned second preferred embodiment, since the elastic force of the spring 49 is transmitted to the valet key 5 via the stopper 48 and the valet key 5 stored in the storage portion 42 is pushed out when the locking by the locking bar 44 is released, it becomes easy to take out the valet key 5 from the storage portion 42.

It should be noted that the present invention is not intended to be limited to the above-mentioned embodiments, and the various kind of changes thereof can be implemented without departing from the gist of the invention.

What is claimed is:

1. A valet key storage system for an automotive vehicle having an engine switch capable of being started by both a regular key and a valet key, comprising:
    a valet key for unlocking and starting the vehicle, the valet key having an opening;
    a valet key storage portion located in the body of the vehicle for storing the valet key;
    a locking bar for locking the valet key in the valet key storage portion;
    an elastic driving member for driving the locking bar into the opening of the valet key by elastic force;
    a locking pin for locking the locking bar;
    a driving section for driving the locking pin into engagement with a recess in the locking bar to lock the locking bar;
    a control section for controlling the driving section to extend or withdraw the locking pin to or from the recess in the locking bar upon the actuation of a valet switch.

2. The valet key storage system, according to claim 1, wherein:
    the recess in the locking bar is located on a side surface of the locking bar.

3. The valet key storage system, according to claim 1, wherein:
    the locking bar has a first slant at a tip end which contacts with the opening of the valet key when the valet key is inserted into the valet key storage portion, and a second slant at the tip end which contacts with the opening of the valet key when the valet key is removed from the valet key storage portion.

4. The valet key storage system, according to claim 1, wherein:
    the body has an antenna which communicates with the valet key stored in the valet key storage portion.

5. The valet key storage system, according to claim 1, wherein:
    the valet key and the control section have an immobilizing function, and the control section communicates with the valet key stored in the valet key storage portion in a predetermined period based on the immobilizing function.

6. The valet key storage system, according to claim 1, wherein:
    the control section invalidates a function of the valet key when the valet key is removed from the valet key storage portion in a non-valet mode.

7. The valet key storage system, according to claim 1, wherein:
    the driving member is a spring.

8. The valet key storage system, according to claim 1, wherein:
    the driving section is a solenoid.

9. The valet key storage system, according to claim 1, wherein:
    the valet key storage portion has a stopper supported by an elastic member on a bottom surface of the valet key storage portion, the elastic member being compressed by the stopper when the valet key is stored in the valet key storage portion, and the valet key being locked by the locking bar inserted in the opening of the valet key, while one end of the valet key is projected from the valet key storage portion in accordance with an elastic force of the elastic member when the valet key is unlocked.

10. The valet key storage system, according to claim 5, wherein:

the control section shifts the valet key storage system into a valet mode when the valet switch is turned on to supply a valet switch-on signal to the control section, and an ID possessed by the regular key of a vehicle and an ID of the vehicle are certified by the immobilizing function.

* * * * *